United States Patent [19]
Ege et al.

[11] Patent Number: 5,871,137
[45] Date of Patent: Feb. 16, 1999

[54] AUTOMATED BUTT SPLICER FOR COPPER-BASED TAPES

[76] Inventors: Sigmund Ege, P.O. Box 73, Skoyen, 0212 Oslo 2, Norway; Arne Ramsland, Lokenmoveien 5, 3530 Royse, Norway

[21] Appl. No.: 832,016

[22] Filed: Apr. 2, 1997

Related U.S. Application Data

[60] Provisional application No. 60/013,743 Apr. 20, 1996.

[51] Int. Cl.⁶ .......................... B23K 31/02; B23K 37/04
[52] U.S. Cl. ............................ 228/5.7; 228/171; 228/213
[58] Field of Search ................................ 228/5.7, 13, 171, 228/212, 213, 250, 231, 158; 219/85.14, 85.18, 85.22, 57

[56] References Cited

U.S. PATENT DOCUMENTS

| | | |
|---|---|---|
| 2,206,375 | 7/1940 | Swift . |
| 3,649,800 | 3/1972 | Happel et al. . |
| 3,851,138 | 11/1974 | Metcalfe et al. . |
| 4,110,592 | 8/1978 | Ege . |
| 4,139,145 | 2/1979 | Moore . |
| 4,286,744 | 9/1981 | Gullotti et al. . |
| 4,552,299 | 11/1985 | Sendzimir ................................ 228/5.7 |
| 4,563,563 | 1/1986 | Ege . |
| 4,765,532 | 8/1988 | Uomoti et al. . |
| 5,062,566 | 11/1991 | Ege . |
| 5,098,009 | 3/1992 | Tsuchida et al. . |
| 5,125,559 | 6/1992 | Ege . |
| 5,167,362 | 12/1992 | Ege . |
| 5,169,051 | 12/1992 | Noe ......................................... 228/5.7 |
| 5,217,155 | 6/1993 | Noe ......................................... 228/5.7 |
| 5,242,104 | 9/1993 | Ege . |

FOREIGN PATENT DOCUMENTS

1738552 A1   7/1992   U.S.S.R. .

*Primary Examiner*—Samuel M. Heinrich
*Attorney, Agent, or Firm*—Quarles & Brady

[57] ABSTRACT

Method and apparatus for reliable splices to be made in hard-rolled copper and alloy tapes without buckling or overlap and with splices that are stronger than the tape metal, itself. The invention permits an operator to load a second reel of tape in position such that when a first reel is exhausted, the system will automatically butt splice the tail end of the first tape to the front end of the second tape without the presence of the operator.

8 Claims, 12 Drawing Sheets

AUTOMATED BUTT SPLICER FOR COPPER-BASED TAPES

CROSS-REFERENCE TO RELATED APPLICATION

This application claims the benefit of U.S. Provisional Application Ser. No. 60/013,743, filed Apr. 20, 1996.

TECHNICAL FIELD

This invention relates to apparatus and methods for end splicing copper alloy tapes with silver solder, and more particularly with splicing automatically in a continuously-operated metal stamping system.

BACKGROUND OF THE INVENTION

It has been known to end-splice copper or copper-alloy tapes by means of apparatus that inserts appropriate lengths of silver solder between the cut ends of said tapes while they are positioned over the flat surface of an electrode, lowering another electrode over the area to be spliced and then passing a sufficient current through the two electrodes. Such apparatus performs satisfactorily for small widths of soft copper as described in below named patents but if the copper or alloy is hard rolled or is very wide, consistently satisfactory splices may not be obtained due to buckling of the tape edges or, if the tapes are of fine gauge, areas where they overlap at the seam. Such buckling or overlapping is, of course, intolerable, if the tape is being fed into a punch press or the like.

In U.S. Pat. Nos. 4,563,563 and 5,125,559, issued to one of the applicants of the present invention, disclosures are made that are now part of the industrial art and may be described as part of the procedures herein practiced, but novel improvements, herein disclosed make it practical to apply these butt splicing procedures to hard or especially wide tapes.

A most important industrial application for butt splicing metal tapes is in the metal stamping and punching arts. A coil or reel of the metal tape is fed into the metal punch or stamping machine. After each actuation of the press, the tape is advanced a preset distance and the press actuates again. When the last of the tape leaves the reel, the process can only continue without interruption if a new reel of tape is provided and the tail end of the earlier tape is butt spliced to the new tape. An accumulator storing a length of the tape gives the operator only a short time to make the splice. He must be present when the changeover is required, which makes him unavailable for other duties.

SUMMARY OF THE INVENTION

The presently described method and apparatus allows reliable splices to be made in hard-rolled copper and alloy tapes without buckling or overlap and with splices that are stronger than the tape metal, itself.

The invention permits an operator to load a second reel of tape in position such that when a first reel is exhausted, the system will automatically butt splice the tail end of the first tape to the front end of the second tape without the presence of the operator.

DETAILED DESCRIPTION OF A PREFERRED EMBODIMENT

Figure 1:
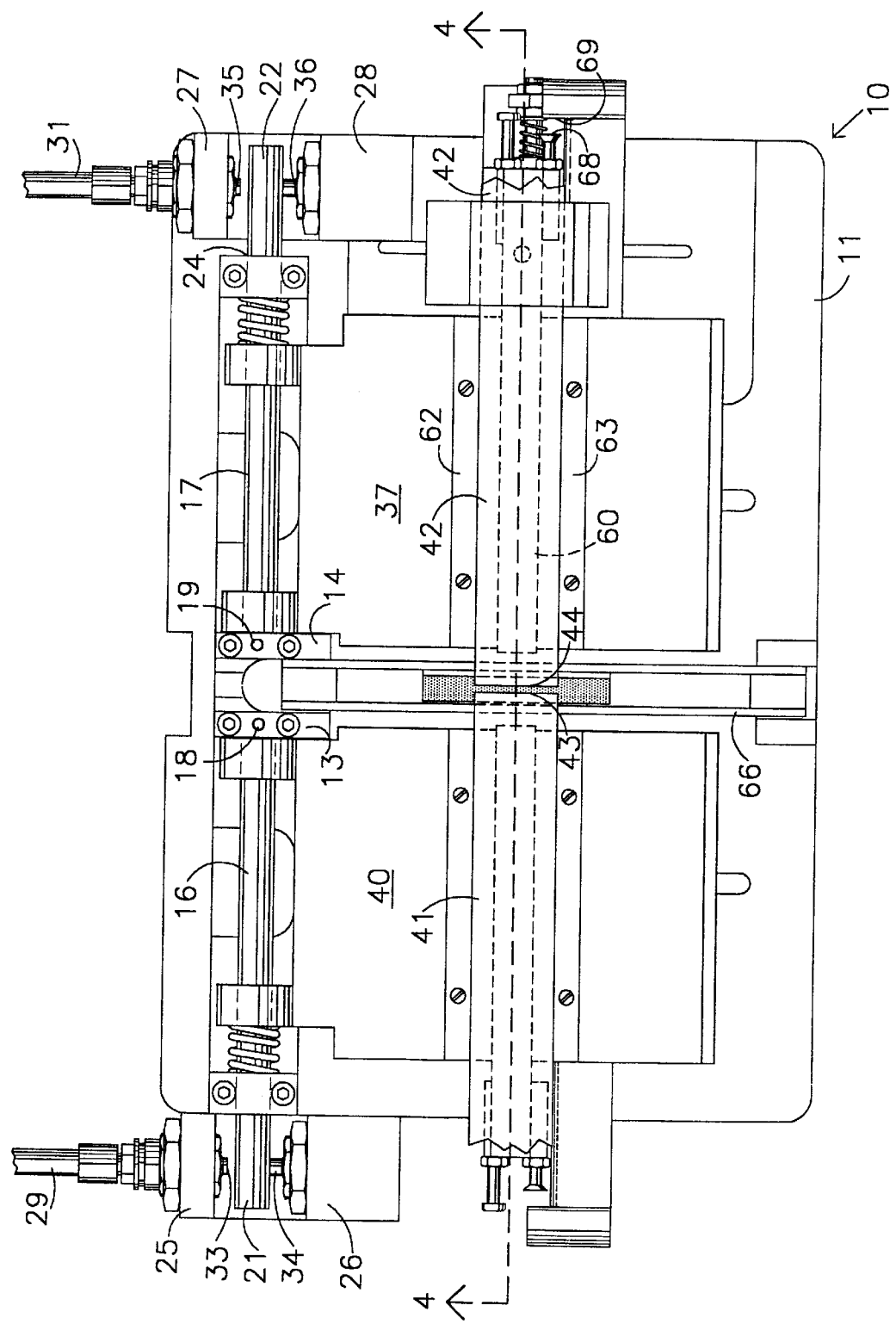
FIG. 1 shows a plan view of the apparatus of our invention, omitting the upper jaws.
Figure 2:
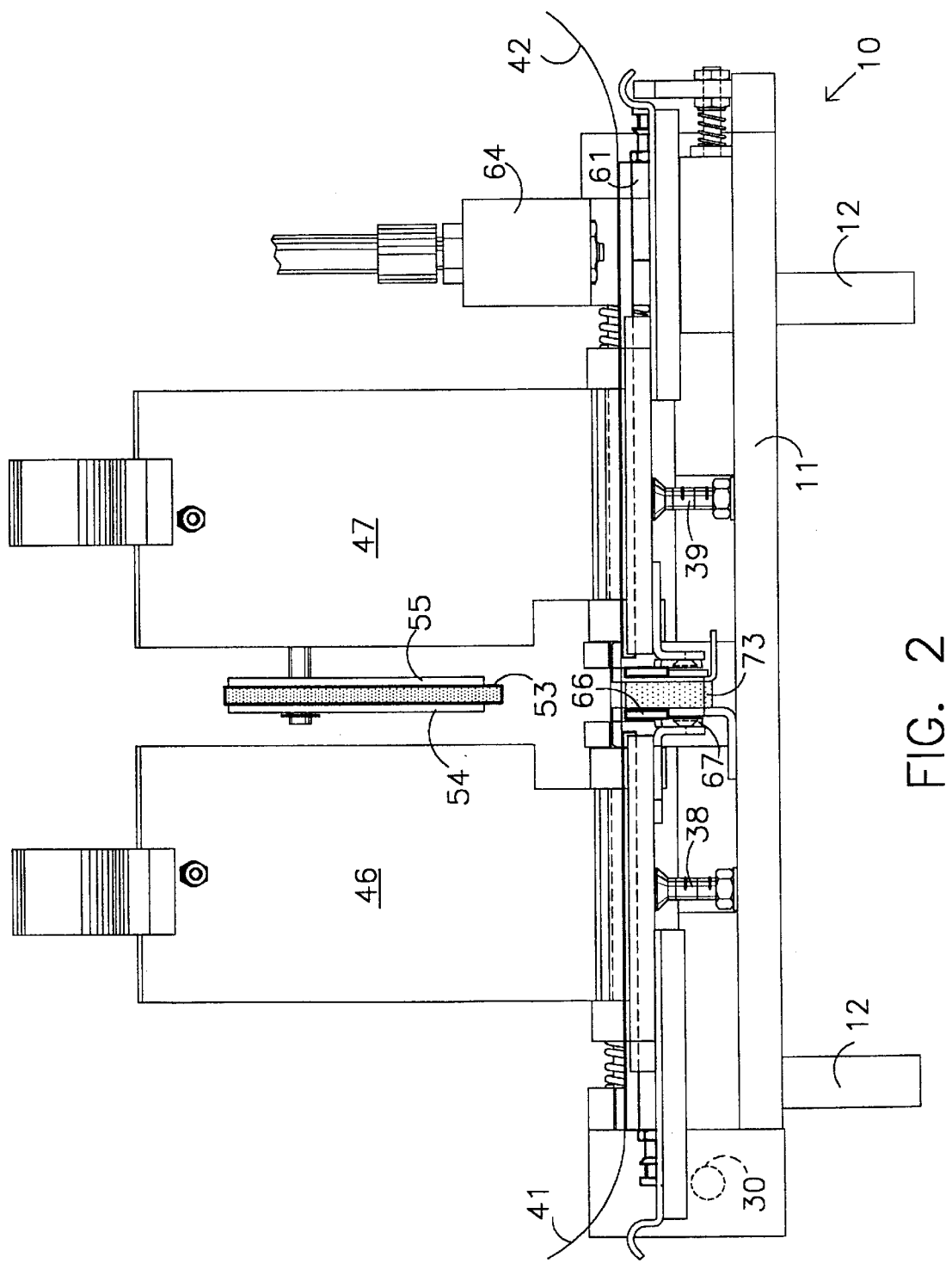
FIG. 2 shows a front elevation of the apparatus of FIG. 1, with the upper jaws raised.
Figure 3:
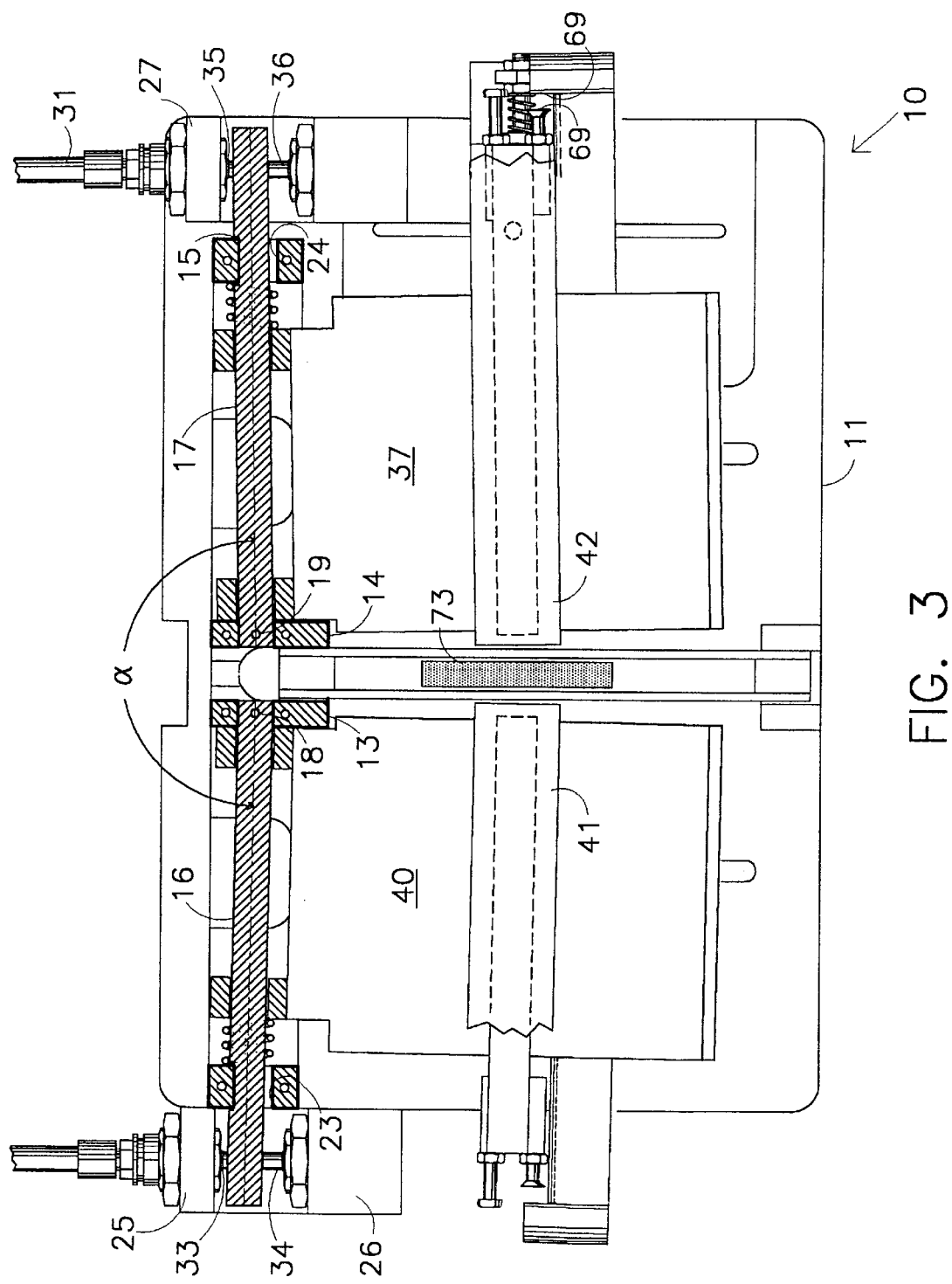
FIG. 3 shows a section through lines 3—3 of FIG. 5.

Referring first to FIGS. 1 and 2 our apparatus 10 comprises a sturdy planar platform 11, supported by 4 columns 12—12, and, in turn, supporting hinge rod brackets 13, 14 that hold horizontal hinge rods 16, 17 so that they can pivot somewhat, horizontally, around respective pins 18, 19 (see, also, FIG. 3). As shall be explained, these hinge rods 16, 17 mount supporting surfaces for the tape ends that shall be spliced.

Figure 4:
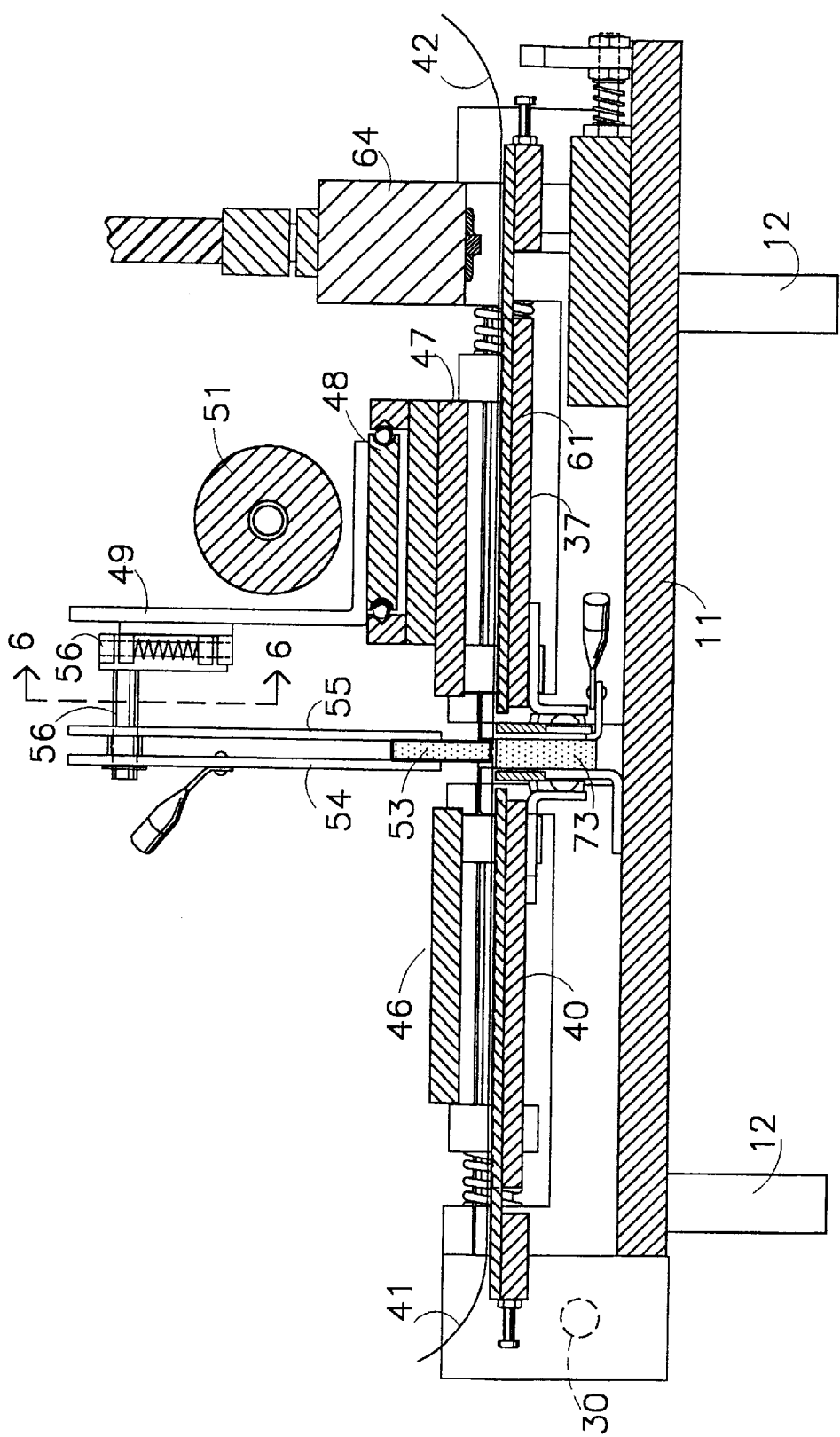
FIG. 4 shows a vertical section through lines 4—4 of FIG. 1.
Figure 5:
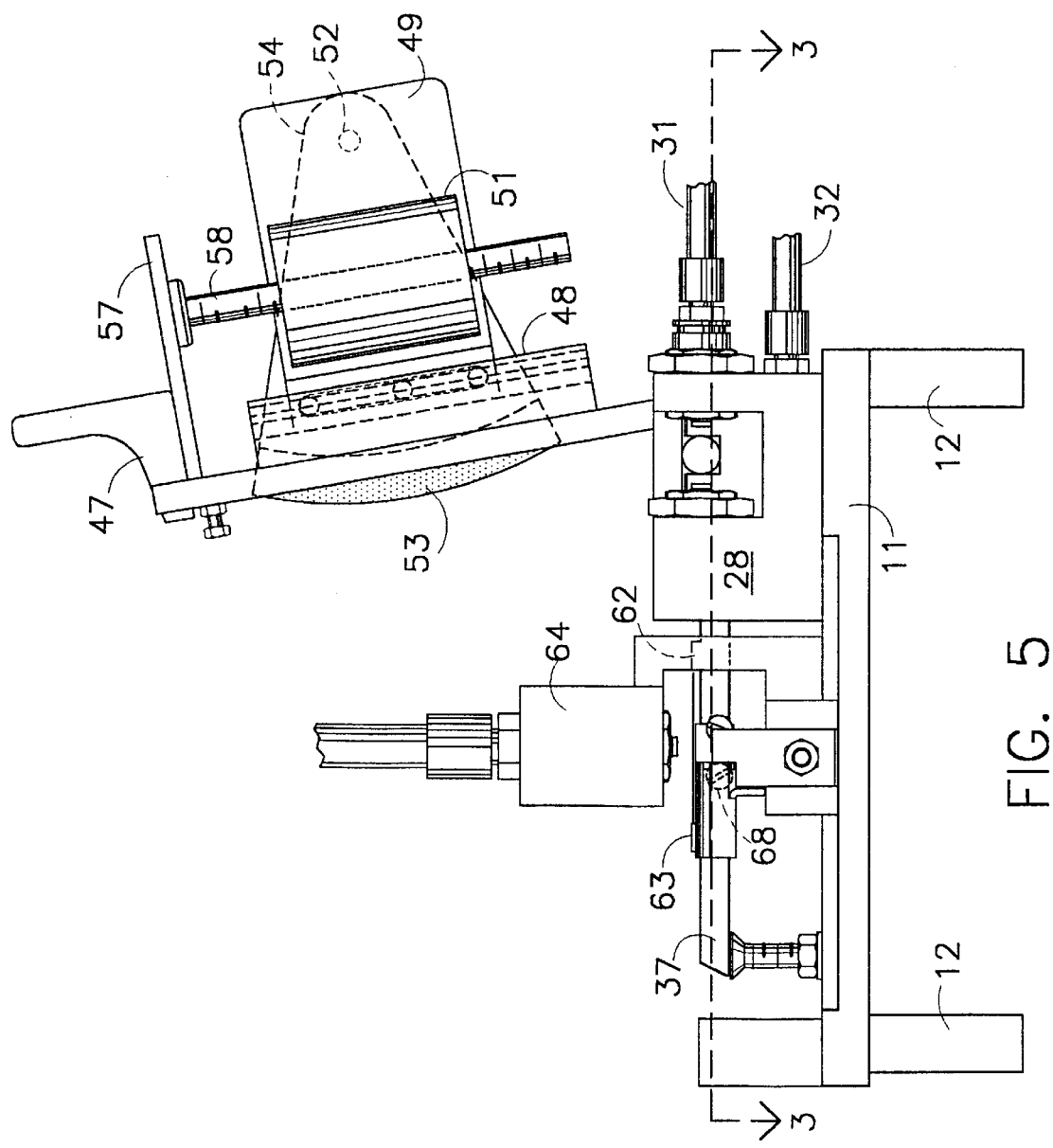
FIG. 5 shows a side elevation of our invention with the elements spread out in rotation.
Figure 7:
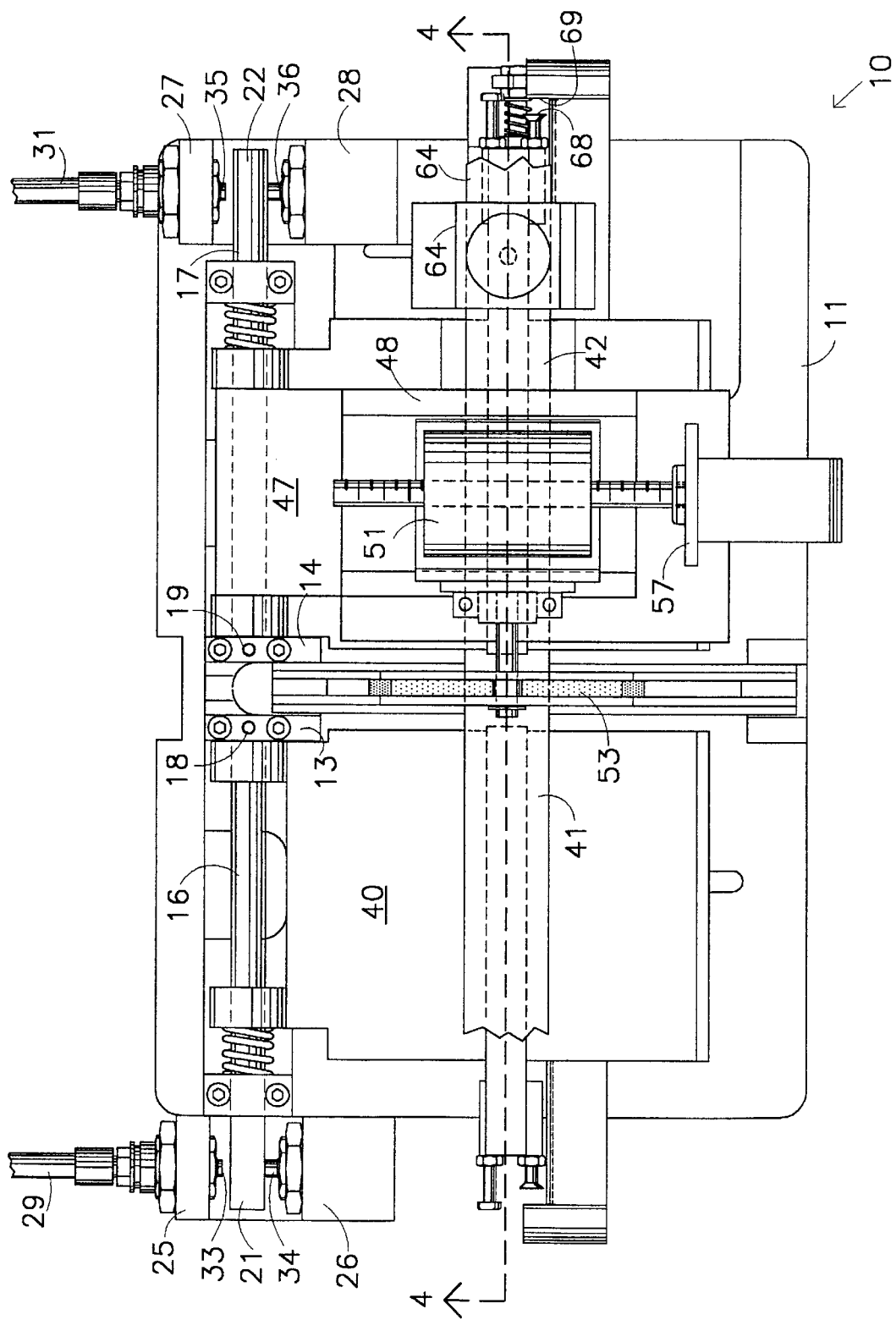
FIG. 7 shows the plan view of our apparatus of FIG. 1 with the right upper jaw lowered.

Opposite ends 21, 22 of the hinge rods 16, 17 protrude from respective mounts 23, 24, (FIG. 3) and within these mounts a flat area 15 has been milled into each of said hinge rods to allow horizontal movement of the rods within the mounts. Four air cylinders 25, 26, 27, 28, powered from a plant compressed-air supply from hoses 29, 30, 31, and 32 (see, also, FIGS. 4 and 5) comprise respective short pistons 33, 34, 35, 36. These pistons push against the projecting hinge rods 16, 17 and can swing them around the axes 18, 19 for a very small angle. At the beginning of a splicing operation the pistons 33 and 35 of the air cylinders 25 and 27 will have been extended to align the shafts 16, 17 on the same central axis but, after the pistons 34, 36 of the cylinders 26, 28 have been extended the shafts 16, 17 will be aligned at a slight angle to each other.

The hinge rods 16, 17 mount respective supporting surfaces generally called "lower jaws" 40, 37 which rotate down to rest on supporting posts 38, 39 (FIG. 2) and hold respective tape ends 41, 42 (see FIG. 1) to be spliced. With the hinge rods 16, 17 in line by application of air pressure to the cylinders 25 and 27, the lower jaws 40, 37 will be aligned so that edges 43, 44, if they have been cut square, will be parallel. When, however, air pressure is cut off from the air cylinders 25 and 27 and applied to the cylinders 26 and 28, forming an angle "alpha" between the axes of the hinge rods 16 and 17 an angle "180 degrees—alpha" (see FIG. 4) will form between the edges 43, 44 of the tape ends.

Figure 6:
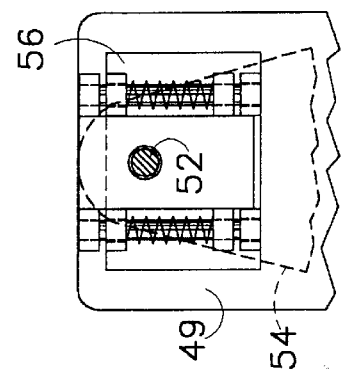
FIG. 6 shows a section through lines 6—6 of FIG. 4.

In addition to lower jaws 40, 37 the hinge rods 16, 17 rotatably support respective upper jaws 46, 47 (FIG. 2) of which the jaw 47 supports a linear ball-bearing table 48 which, in turn, supports a bracket 49 for a linear step motor 51 and a stub shaft 52 for a segmental electrode 53 mounted between two sector shaped plates 54, 55. This stub shaft 52 constitutes the center of the circle of which the electrode 53 is a segment, so that, as the stub shaft 52 is advanced the surface of the segment 53 makes rolling contact with the edges being soldered together. To ensure adequate contact of the electrode 53 with the tapes being spliced, the stub shaft 52 is spring mounted by means of a bracket 56 (see FIGS. 4 and 6). The upper jaw 47 mounts an upright 57 to which is cantilevered a horizontal screw 58. The step motor 51 includes an internal rotor that is threaded to the screw 58 and advances the motor along with the table 48, in a predetermined number of steps and a predetermined length of electrical discharge at each step.

A fixed electrode 73 is bracketed to but insulated from the plate 11 to serve as the lower electrode of the soldering operation.

OPERATION

In the operation of our apparatus both upper jaws 46, 47 and the left lower jaw 40 are manually raised. A sliding bar 61, in a groove 60 between two guide rails 62, 63 in the lower right jaw 37 is moved toward the left until it reaches a stop. A tape 42, one of the two tapes to be spliced, is then placed over the sliding bar 61 and between the guide rails 62, 63 (FIGS. 1 and 4) so as to extend over a cutting blade 66 bracketed to the base plate 11. The upper right jaw 47 is then manually lowered, automatically activating an air cylinder 64, by switching, not shown, to clamp the tape 42 to the sliding bar 61. The lower left jaw 40 is then manually lowered to cut the tape 42 by means of a blade 67 to form the edge 44. Both right-hand jaws 37 and 47 are then raised together and the sliding bar 61 pulled to the right until a screw head 68 reaches a stop 69.

A similar procedure is then applied to the left-hand tape 41 to trim the edge and locate it for the proper soldering position with both lower jaws and the left upper jaw down and the upper right jaw raised. A switch is then manually applied to supply power to our apparatus 10 and feed a predetermined length of silver solder (as illustrated in FIG. 2 of U.S. Pat. No. 5,125,559).

At this point the right-hand upper jaw is manually lowered, automatically triggering the following operations. Apparatus mounted on the plate 11 pushes the bar 61 to the left to close the gap between the tape edges 43 and 44, pistons 33 and 35 are retracted and pistons 34 and 36 are extended to make the hinge rods 16 and 17 form a slight angle with each other, maintaining some pressure on the hinge rods 16 and 17 during the splicing operation. Current flows between the upper electrode 53, the tape ends 43, 44 and the lower electrode 73, and the stepper motor 51 starts advancing the table 48. After a short time, typically less than 0.2 seconds, the current pulse is automatically interrupted, while the stepper motor 51 continues to advance the table 48. After advancing the table a short distance, typically 2 mm, the step motor automatically stops. This cycle of a short current pulse and advancing of the step motor until the upper electrode 53 reaches the end of the splice.

Advancing the table 48 and stub shaft 52, which constitutes the center of the circle of which the upper electrode 53 forms a segment has the effect of rolling the segment 53 across the splice that is to be secured, making only line contact of the electrode to the tapes at any point. This can be accomplished by using a much smaller wheel for the electrode within the scope of our invention but we have found that the smaller diameter electrode creates a rougher splice surface.

Both upper jaws are now manually raised and this action automatically releases the spliced tape from the jaw clamps, retracts the cylinder pistons 34 and 36 while operating pistons 33 and 35 to bring the two hinge rods 16 and 17 in line, and brings the table 48 back to its starting position.

Figure 8:
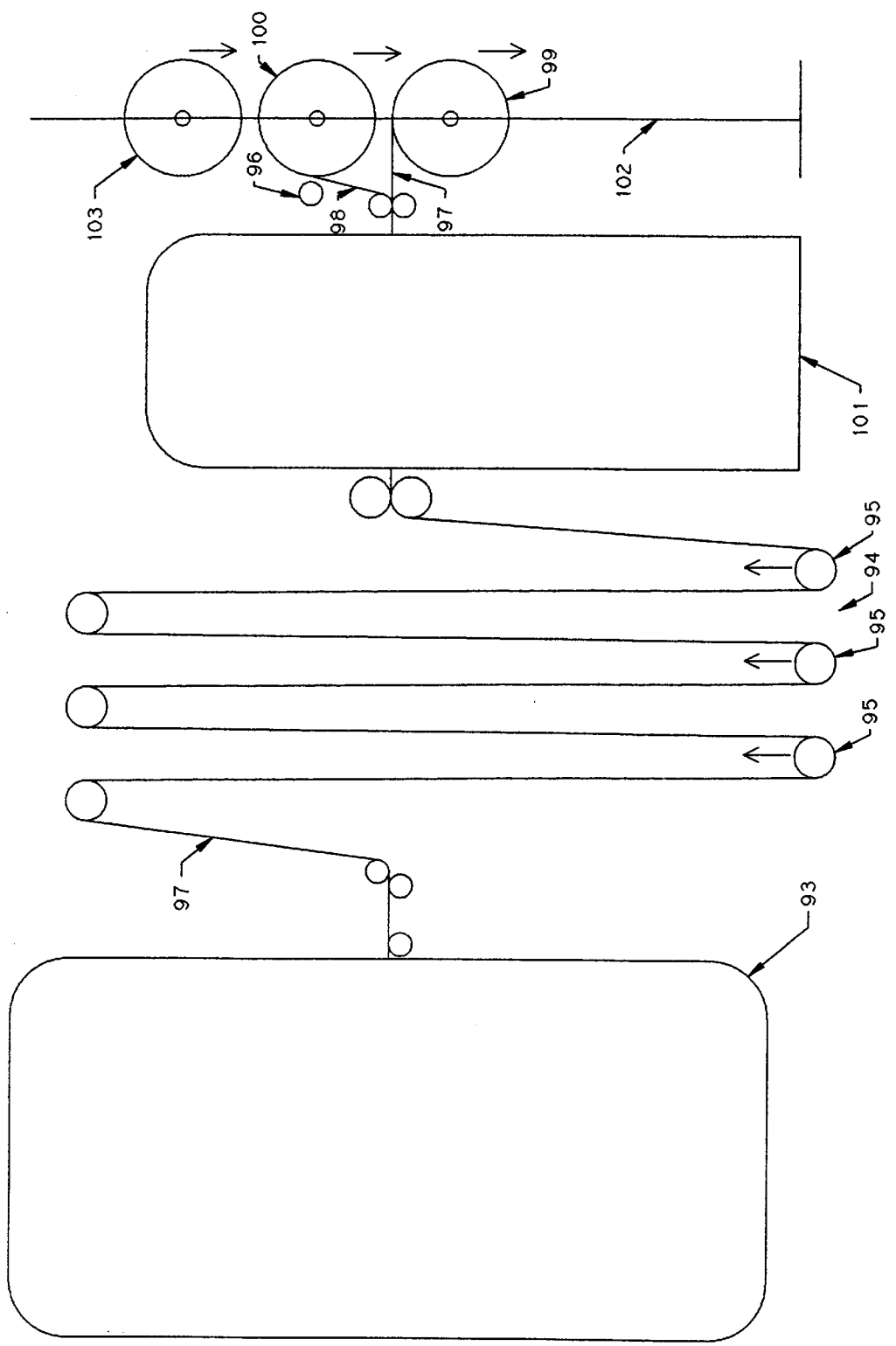
FIG. 8 shows a diagrammatic front elevation view of a stamping system with multiple reels of tape preloaded in combination with an alternative embodiment of a splicer according to the invention.
Figure 9:
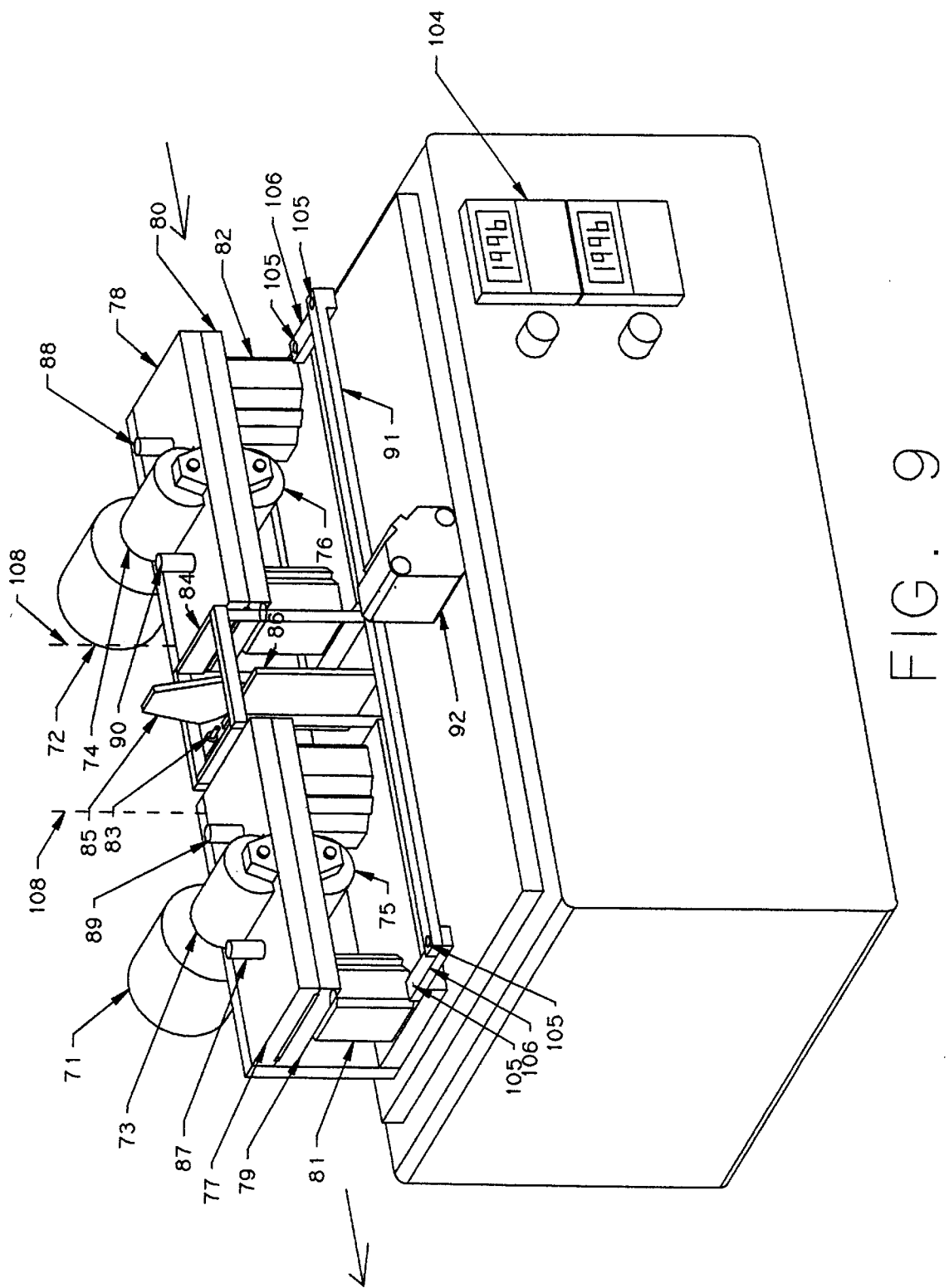
FIG. 9 shows a perspective view of the splicer in FIG. 8.

An alternative embodiment of the invention is illustrated in FIGS. 8 and 9. The splicer in FIGS. 8 and 9 enhances the foregoing process by providing an apparatus and method capable of automatically butt splicing a tape from a new full reel of tape to the tail end of an empty reel of tape, in the absence of an operator. As a result, a punching or stamping machine can be fed with the tape continuously and without interruption.

Referring now first to FIG. 8, an automatic stamping or punching machine 93 of the type well known in the art for use with metal tapes is fed with a copper based wide tape 97 from a large spool or reel 99 held on a reel support 102 with at least one additional preloaded reel 100. An additional pre-loaded reel 103 is also shown in FIG. 8 on reel support 102. The tape 97 is fed through a splicer 101 of the present invention and an accumulator 94 of a type which is well known in the art. As shown in FIG. 8, the accumulator 94 has rollers 95 which can move upward for providing a continuous supply of tape 97 for a predetermined interval when the input to the accumulator 94 is clamped. The splicing machine 101 is shown in a perspective view in FIG. 9.

Figure 10:
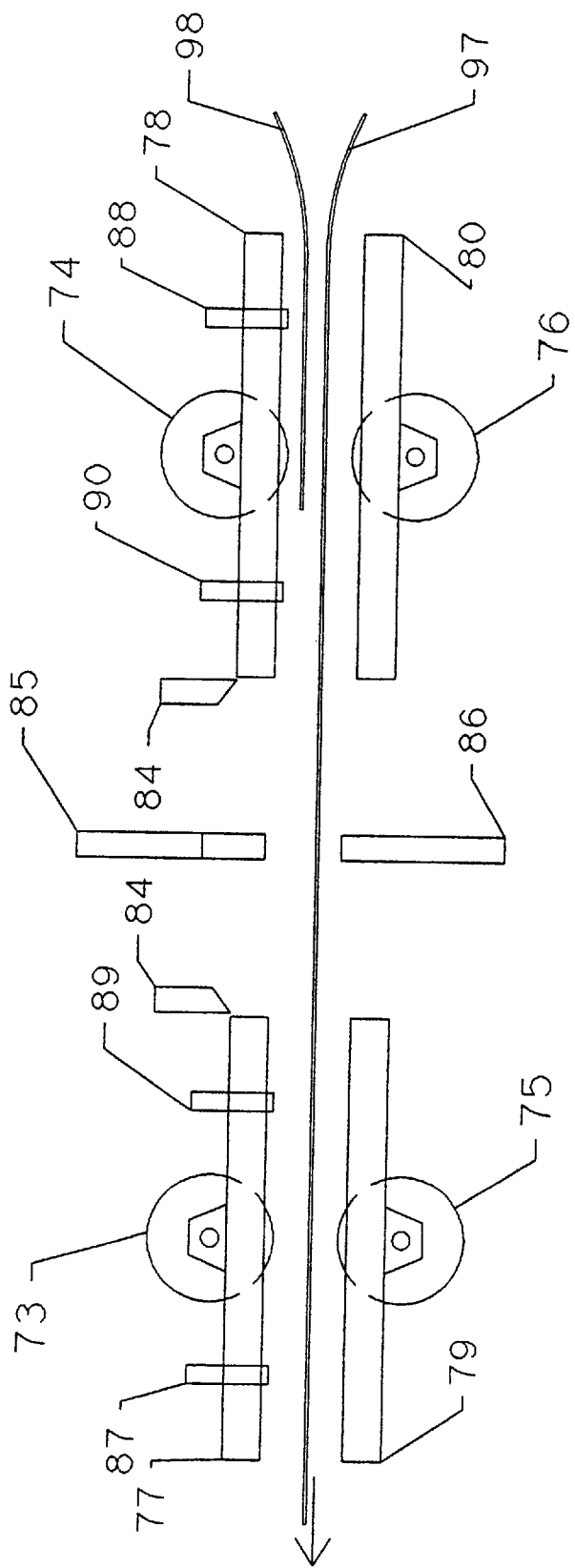
FIG. 10 shows the splicer in FIG. 8 in a schematic representation wherein a tape is continuously passing therethrough.

The operation of the system is now better seen by reference to FIGS. 9 through 13. As shown in FIG. 10, while tape 97 is being continuously fed from reel 99 through splicer 101, the front edge of new tape 98 is fed a short distance into the splicer 101 (from the right hand side in FIG. 9), so that it is positioned between drive rollers 74, 76 on one side, and cutting mechanism 84 on the other side. The tape 98 can be positioned by hand or by an automatic tape feed (not shown). Once tape 98 is in position, clamp 96 is applied to the reel, as shown in FIG. 9, to stop feeding of new tape 98 until the old tape 97 is exhausted from reel 99. It should be noted that the new tape 98 is preferably pre-positioned in the splicer 101 while the old tape 98 is drawn through the splicer 101 toward the automatic stamping or punching machine 93. The position and movement of tapes 97 and 98 are not effected during this period by the splicing machine 101 because the lower jaws 79, 80 are in their lowered position, spaced apart from upper jaws 77, 78. Likewise, as shown in FIG. 10, new tape 98 is positioned above the tape 97 as tape 97 passes through the splicer, but does not interfere with the transport of tape 97 as tape 97 is drawn toward punching machine 93. The splicer 101 remains in this configuration until the tail end of the tape 97 passes sensor 89 of the splicer.

Figure 11:
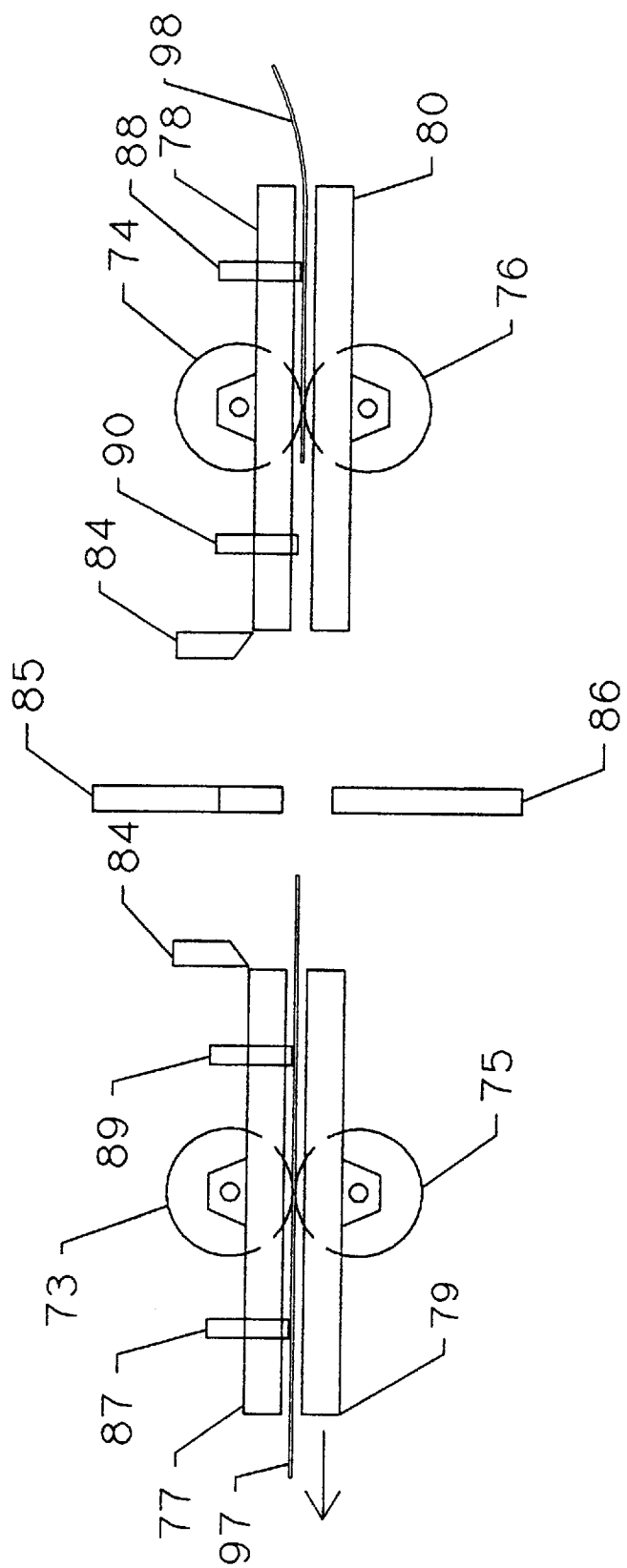
FIG. 11 shows the splicer in FIG. 8 in a schematic representation wherein an end of an old tape has passed one set of jaws and a new tape is being advanced.
Figure 12:
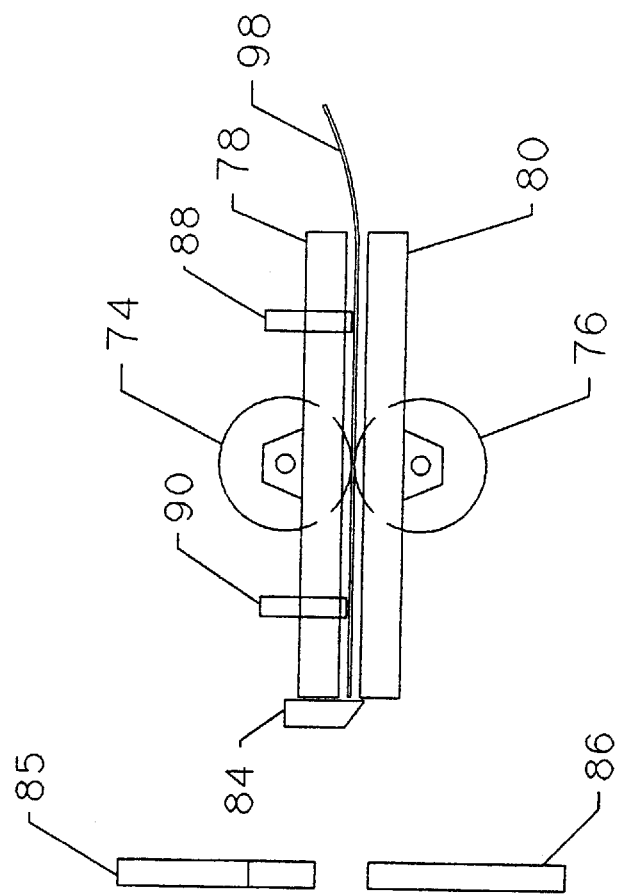
FIG. 12 shows the splicer in FIG. 8 in a schematic representation wherein the ends of the old and new tapes are trimmed.
Figure 12:
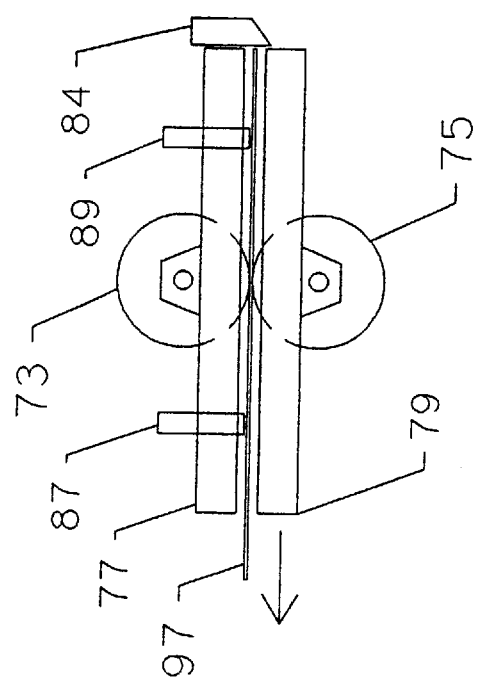

When the tail end of the old tape 97 is sensed by sensor 89, the left lower jaw 79 is raised by means of left lower lift 81 to clamp the tape 97 between the two left drive rollers 73 and 75. This stops further feed to the accumulator and the stamping machine begins to draw the remainder of 97 tape from the accumulator 94. As shown in FIG. 11, it also activates the stepper motor 71 which rotates the two rollers 74, 76 to feed the tail end of the old tape 97 backwards, past the cutting anvil which is formed by the end of the lower jaw 79 (right side of lower jaw 79 in FIG. 9). The cutting mechanism 84 will subsequently be lowered, as shown in FIG. 12, to cut the tail end of the old tape 97. Cutting mechanism 84 is designed to move vertically in close contact with or immediately adjacent to the cutting anvil. The cutting mechanism 84 is preferably moved by a pneumatic or hydraulic cylinder mechanism or by other electromechanical means (not shown).

As described above, the leading edge of the new tape 98 from new, full reel 100 is pre-positioned between the open right upper and lower jaws 78 and 80. Thus when the tail end of the old tape 97 is sensed by the sensor 89, the right lower jaw 80 is elevated by lower lift 82, clamp 96 is released and stepper motor 72 drives rollers 74, 76 to advance the new tape and cut it with cutter 84 by a process similar to that described with respect to tape 97. In particular, the new tape is advanced by rollers 74, 76 so that the front edge of the tape 98 is positioned past the cutting anvil which is formed by the end of the lower jaw 80 (left side of lower jaw 80 in FIG. 9). The cutting mechanism 84 is then lowered as shown in FIG. 12, to cut the front edge of the new tape 98. In a preferred embodiment, the rollers 73, 75, 74, 76 are operated so that the trimming of tapes 97 and 98 can be performed at the same time, in the manner shown in FIG. 12.

In FIG. 9, lifts 81 and 82, which control the movement of the lower jaws 79 and 80, are preferably comprised of hydraulic or pneumatic type cylinders. However, the invention is not limited in this regard, but may also be in the form of any other suitable electromechanical type mechanism which is capable of lifting lower jaws 79, 80 into position as described herein.

Figure 13:
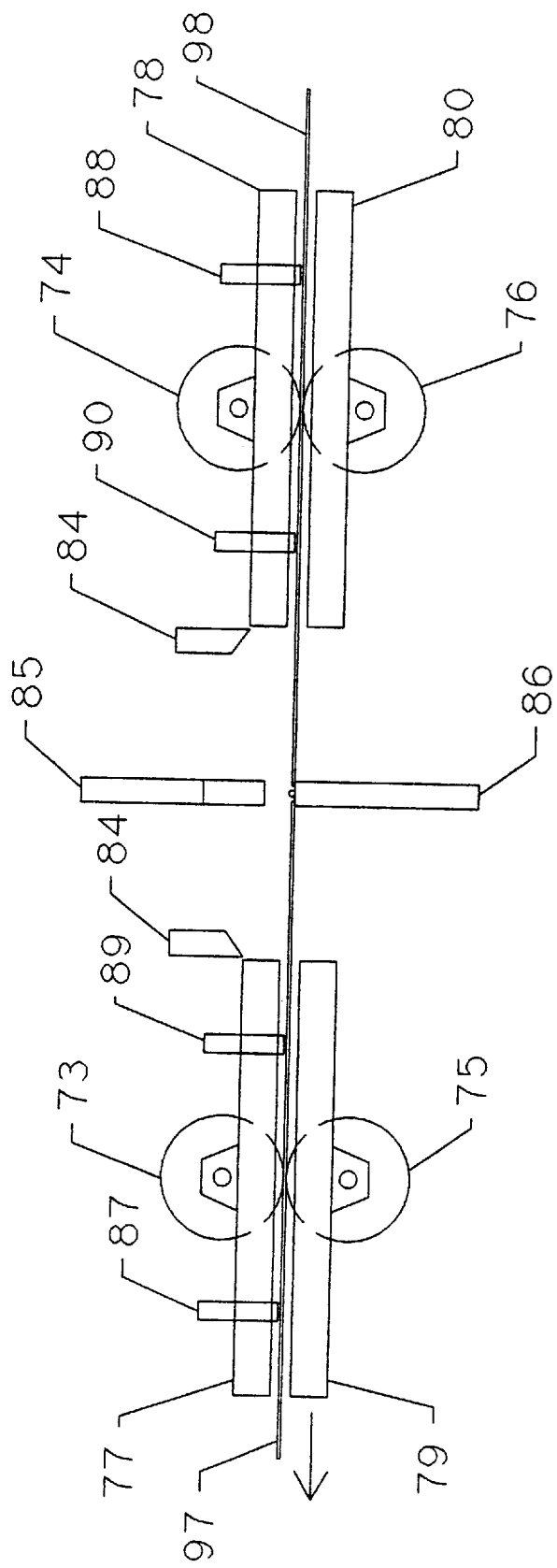
FIG. 13 shows the splicer in FIG. 8 in a schematic representation wherein the ends of the old and new tapes are spliced.

As a result of the foregoing process, the ends of the old and new tapes 97, 98 are cut clean and square for soldering. In a preferred embodiment, the stepper motors 71, 72 are provided with encoders so that, using the information from sensors 89 and 90, the two cut ends may be precisely juxtaposed for most effective automatic soldering with the solder therebetween. After raising the cutting mechanism, as shown in FIG. 13, the two tape ends will be fed a predetermined distance to so that they are precisely positioned on top of the lower electrode 86, and spaced apart enough to allow silver solder (in the form of wire) to be fed between them by a feeding mechanism (not shown) through the guide tube 83. The length of solder wire fed will be such as to barely extend from one elongated side of the tape to the other. Subsequently, the upper electrode 85 will be lowered by suitable pneumatic, hydraulic or electro-mechanical means, until the upper electrode rests on the two tape ends (or on the solder wire if the latter has a diameter greater than the thickness of the tape). The upper electrode 85 is preferably a segmental electrode similar to electrode 53 as described with respect to the embodiment of the invention shown in FIGS. 1–7, and it is configured for being advanced in the same manner across the surface of the tape.

Referring now to FIG. 9, the soldering process will now be described. Actuator 92 exerts a force on pivot linkage 91, which pushes the outside ends of the two jaw assemblies towards the rear so as to make them rotate slightly around pivot axes 108 on vertical pivots (not shown) to make the two tape ends form a "V". The two step motors 71 and 72 then activate the rollers to close the gap between the two tapes (at the base of the "V"). Current is passed from the upper electrode 85 to the lower electrode 86 via the tape ends to cause the ends to heat up enough to melt the solder at the point where the curved upper electrode 85 rests on the ends (at the base of the "V"). At the same time the bearing for the shaft around which the upper electrode is free to rotate is moved a short distance forward to cause the electrode to roll along the tape ends. After a short period (typically less than one second) the current is shut off, while the electrode moves forward somewhat more. Finally, after a brief stop the above cycle is repeated until the electrode reaches the far tape edge, at which time a non-contact sensor (not shown) riding on one of the two tapes automatically will stop the further heating and advancing. The splice is now finished and the two lower jaws 79 and 80 will be lowered to free the spliced tape so that the accumulator 94 may now be refilled as a tape is pulled from preloaded reel 100. Note that due to the successive heating and cooling of the copper metal near the contact point of the upper electrode, the original "V" shape will disappear to leave the spliced tape again with parallel edges, resulting in a straight spliced tape. Actuator 92 is now relaxed so that the jaws are once again aligned.

Actuator 92 is preferably a pneumatic or hydraulic cylinder, but may also be provided in the form of any other suitable electromechanical device. Further, as shown in FIG. 9, pivot linkage 91 is preferably formed with a plurality of pivot links 105 so that arms 106 are not twisted or bent when the two jaw assemblies are pivoted around their pivot axes 108. A control means 104 is preferably provided in the form of a programmable microprocessor for coordinating and controlling the operation of stepper motors 71, 72, lifts 81, 82, actuator 92, and electrode 85.

From this time, until reel 100 is exhausted, the operator may at any time remove empty reel 99, lower reel 100 and lower reel 103 and position its leading tape edge within the right side jaws 78, 80 of the splicer, ready for another automatic splicing.

I claim:

1. In a continuous metal tape feeding system, an apparatus for automatically butt-splicing a tail end of a first tape to a leading edge of a second tape, each of said tapes defining two lengthwise edges thereof, said apparatus comprising:

a splicer for splicing said tail end of said first tape to said leading edge of said second tape, said splicer comprising a sensor (89) for detecting said tail end of said first tape, and a first and second pair of opposing rollers (74, 76) (73, 75);

an accumulator (94);

a tape path defined between said first and second pairs of opposing rollers, and through said accumulator;

means for positioning said second tape in said splicing machine, so that said second tape is aligned along a portion of said tape path, and said leading edge of said second tape extends between said first pair of rollers;

said splicing machine configured so that upon sensing said tail end of said first tape with said sensor (89), said first tape is clamped between said second pair of rollers and said second tape is clamped between said first pair of rollers, and means responsive to said sensor (89) for driving said first and second tapes toward each other so that said so that said tail end of said first tape and said leading edge of said second tape are slightly spaced apart from each other for soldering.

2. The apparatus according to claim 1 further comprising a microprocessor controller for controlling the operation of said splicer.

3. The apparatus according to claim 1 wherein said first and second pairs of rollers are mounted in corresponding first and second pairs of upper and lower jaws (77, 78, 79, 80).

4. The apparatus according to claim 3 wherein said rollers are rotatably mounted in each of said upper and lower jaws, at least one roller of each of said first and second pair of rollers operatively connected to a stepper motor for driving said tapes.

5. A method for automatically butt-splicing the ends of a first and second tapes (97, 98) formed of a metal in a continuous tape feeding system, comprising the steps of:

(A) feeding said first tape (97) in a forward tape direction between a first (74, 76) and second (73, 75) pair of rollers;

(B) feeding said first tape (97) from said second pair of rollers (73, 75) through an accumulator (94);

(C) pre-positioning a leading edge of said second tape between said second pair of rollers aligned with a feed path of said first tape (97);

(D) sensing an end of said first tape (97), and clamping said first and second tapes respectively between said first and second pair of rollers in response thereto;

(E) positioning said first and second tapes by means of said rollers so that said leading edge and said end are each positioned for soldering;

(H) soldering said trimmed ends together; and (I) un-clamping said first and second tapes from between said first and second pairs of rollers so that feeding of said tapes may continue.

6. The method of claim 5 wherein said first and second tapes are positioned for soldering by driving said first tape in a reverse tape direction and driving said second tape in a forward tape direction.

7. The method of claim 5 wherein the end of said first tape and said leading edge of said second tape are trimmed prior to said soldering step so as to form a pair of trimmed ends.

8. The method according to claim 7, wherein said step of soldering said trimmed ends further comprises the steps of:

(A) fixing said trimmed end of said second tape at a slight angle to said trimmed end of said first tape;

(B) positioning an upper electrode comprising a continuous upwardly curved surface, into line contact with said trimmed ends, close to one of said lengthwise edges of said tapes, (C) passing a short duration of current between said upper electrode and a lower electrode, thereby locally fusing said solder, (D) thereafter rolling said curved surface across said spaced-apart trimmed ends and said solder, and passing a plurality of short durations of current between said electrodes, thereby effectively joining said ends, and (E) permitting the position of at least one of said tapes to rotate slowly so as to reduce said angle during said butt splicing.

* * * * *